United States Patent
Sridharan et al.

(10) Patent No.: US 12,535,964 B2
(45) Date of Patent: Jan. 27, 2026

(54) SYSTEMS AND METHODS FOR HYBRID STORAGE

(71) Applicant: Samsung Electronics Co., Ltd., Suwon-si (KR)

(72) Inventors: Shrihari Sridharan, West Lafayette, IN (US); Hui Zhang, Campbell, CA (US); Changho Choi, San Jose, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 214 days.

(21) Appl. No.: 17/827,298

(22) Filed: May 27, 2022

(65) Prior Publication Data

US 2023/0325101 A1 Oct. 12, 2023

Related U.S. Application Data

(60) Provisional application No. 63/330,218, filed on Apr. 12, 2022.

(51) Int. Cl.
*G06F 3/00* (2006.01)
*G06F 3/06* (2006.01)
(Continued)

(52) U.S. Cl.
CPC .......... *G06F 3/0644* (2013.01); *G06F 3/0604* (2013.01); *G06F 3/0689* (2013.01);
(Continued)

(58) Field of Classification Search
CPC .. G06F 3/0644; G06F 16/221; G06F 16/2282; G06F 16/258; G06F 16/20
See application file for complete search history.

(56) References Cited

U.S. PATENT DOCUMENTS 9,575,982 B1* 2/2017 Sankara Subramanian ................. G06F 3/0608
10,296,462 B2 5/2019 Loaiza et al.
(Continued)

FOREIGN PATENT DOCUMENTS

CN 106874437 B 8/2019
CN 113535729 A 10/2021

OTHER PUBLICATIONS

Mihali, C. et al. "The Case for Adding Privacy-Related Offloading to Smart Storage," SYSTOR '21, Jun. 1-16, 2021, Haifa, Israel, 11 pages.

(Continued)

*Primary Examiner* — Reginald G Bragdon
*Assistant Examiner* — Michael L Westbrook
(74) *Attorney, Agent, or Firm* — Womble Bond Dickinson (US) LLP

(57) ABSTRACT

Embodiments of the present disclosure are directed to a method for storing and processing data. The method includes identifying a database in a memory of a host device having one or more rows and one or more columns. A partition having a partition size is identified, and the one or more rows of the database is identified based on the partition size. The data stored in the one or more rows is converted into a column-based format, and the data is stored in a computational storage device in the column-based format. The computational storage device is configured to retrieve the data stored in the column-based format, in response to a query, and process the query based on the data.

20 Claims, 8 Drawing Sheets

(51) Int. Cl.
  *G06F 16/00* (2019.01)
  *G06F 16/20* (2019.01)
  *G06F 16/22* (2019.01)
  *G06F 16/25* (2019.01)
(52) U.S. Cl.
  CPC ............ *G06F 16/20* (2019.01); *G06F 16/221* (2019.01); *G06F 16/2282* (2019.01); *G06F 16/258* (2019.01)

(56) References Cited

U.S. PATENT DOCUMENTS

| | | | |
|---|---|---|---|
| 10,311,154 B2 | 6/2019 | Lahiri et al. | |
| 11,030,149 B2 | 6/2021 | Rupp et al. | |
| 11,132,300 B2 | 9/2021 | Loh et al. | |
| 2006/0123035 A1* | 6/2006 | Ivie | H03M 7/30 |
| 2010/0281004 A1 | 11/2010 | Kapoor et al. | |
| 2011/0029569 A1 | 2/2011 | Ganesh et al. | |
| 2015/0347484 A1* | 12/2015 | Klauke | G06F 16/221 707/741 |
| 2017/0123679 A1* | 5/2017 | Yoshii | G06F 12/0868 |
| 2017/0293644 A1* | 10/2017 | Kurokawa | G06F 16/24542 |
| 2018/0232457 A1 | 8/2018 | López et al. | |
| 2019/0102412 A1 | 4/2019 | Macnicol et al. | |
| 2020/0042634 A1* | 2/2020 | Stewart | G06F 16/278 |
| 2021/0286806 A1 | 9/2021 | Ahmadi et al. | |
| 2021/0311923 A1* | 10/2021 | Gohad | G06F 12/0882 |

OTHER PUBLICATIONS

European Search Report for EP Application No. 23165545.7 dated Jun. 15, 2023, 9 pages.
Kemper, A. et al., "HyPer: A Hybrid OLTP & OLAP Main Memory Database System Based on Virtual Memory Snapshots," 2011 IEEE 27th International Conference on Data Engineering, 2011, 12 pages.

* cited by examiner

SYSTEMS AND METHODS FOR HYBRID STORAGE

CROSS-REFERENCE TO RELATED APPLICATION(S)

The present application claims priority to and the benefit of U.S. Provisional Application No. 63/330,218, filed Apr. 12, 2022, entitled "SCALABLE DATA ANALYTICS ACCELERATION WITH HYBRID STORAGE FORMAT AND COMPUTATIONAL STORAGE DEVICE," the entire content of which is incorporated herein by reference.

FIELD

One or more aspects of embodiments according to the present disclosure relate to non-volatile storage devices, and more particularly to storage techniques for storing data in a non-volatile storage device.

BACKGROUND

It may be desirable to use a computational storage device (e.g., a solid state drive (SSD) with an embedded processor or Field Programmable Gate Array (FPGA)), for various data processing tasks, as such a storage device may help provide efficient and cost-effective data processing solutions. The computational storage device may perform computations locally and send results of the computations to a host device.

The above information disclosed in this Background section is only for enhancement of understanding of the background of the present disclosure, and therefore, it may contain information that does not form prior art.

SUMMARY

Various embodiments of the present disclosure are directed to a method for storing and processing data. The method includes identifying a database in a memory of a host device having one or more rows and one or more columns. A partition having a partition size is identified, and the one or more rows of the database is identified based on the partition size. The data stored in the one or more rows is converted into a column-based format, and the data is stored in a computational storage device in the column-based format. The computational storage device is configured to retrieve the data stored in the column-based format, in response to a query, and process the query based on the data.

According to various embodiments of the disclosure, the partition size is a multiple of a size of a database page.

According to various embodiments of the disclosure, the partition size is based on a redundant array of Independent (RAID) stripe size.

According to various embodiments of the disclosure, in the column-based format, values of one of the one or more columns for the one or more rows are stored contiguously in an address space.

According to various embodiments of the disclosure, the converting of the data includes generating a database page storing the data in the column-based format.

According to various embodiments of the disclosure, the database page includes one or more pointers to the one or more columns stored in the database page.

According to various embodiments of the disclosure, the method further includes encoding the database page, wherein the database page is included in the partition; determining a characteristic of the partition; and generating a second database page based on the determining, wherein the second database page stores data in a second row of the database, in the column-based format; and including the second database page into the partition.

According to various embodiments of the disclosure, the method further includes encoding the database page, wherein the database page is included in the partition; determining a characteristic of the partition; and based on the determining, adding second data stored in a second row of the database, to the database page, in the column-based format.

According to various embodiments of the disclosure, the database is generated by an application running in the host device, wherein the query is generated by the application.

According to various embodiments of the disclosure, the computational storage device is a non-volatile memory device coupled to the host device.

Various embodiments of the present disclosure are also directed to a host computing device for storing and processing data, where the host computing device comprises a processor and a memory. The memory stores instructions that, when executed by the processor, cause the processor to: identify a database the memory having one or more rows and one or more columns; identify a partition having a partition size; identify the one or more rows of the database based on the partition size; convert data stored in one or more columns of the one or more rows, into a column format, wherein the data stored in the column format is associated with the partition; and store the data associated with the partition in a storage device in the column format, wherein in response to a query, the storage device is configured to retrieve the data stored in the column format and process the query based on the data.

As a person of skill in the art should recognize, various embodiments of the present disclosure allow acceleration for the computational storage device based on data stored in the column-based format. Data stored in the column-based format may be more effective for compression when compared to data stored in the row-based format. When the row-to-column conversions occur offline, the storage device may experience lower latency, higher throughput, and lower power consumption when compared to inline row-to-column conversions.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
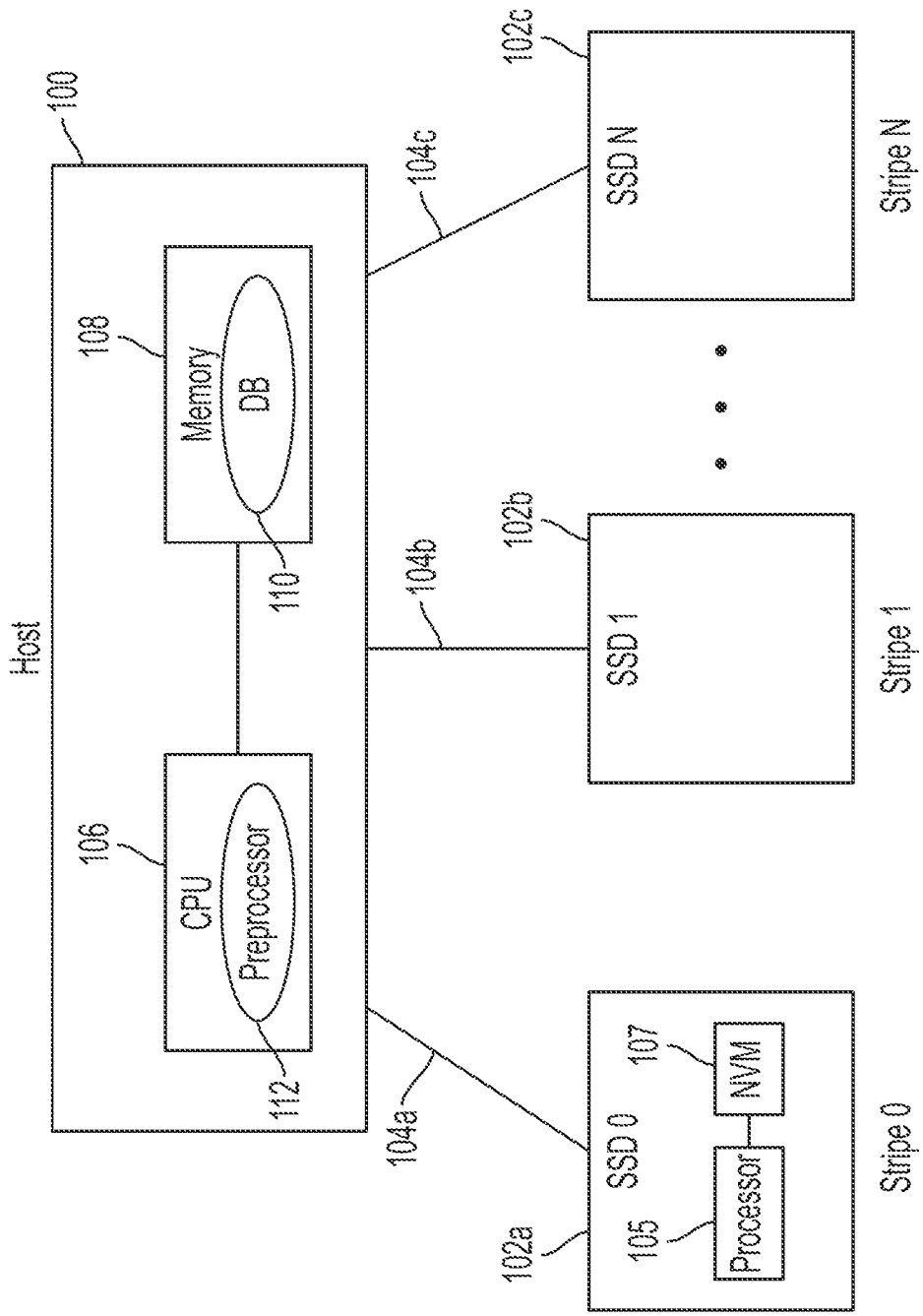
FIG. 1 is a block diagram of a computer system for implementing a hybrid storage technique according to various embodiments of the disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Computations that would otherwise be performed by a processor of a host computing device, may be offloaded to a computational storage device. The storage device may perform the computations in a more efficient and cost-effective manner. Results of the computations may be sent to the host device for further processing and/or use.

The computations performed by the storage device may be based on data stored in non-volatile media (e.g., flash memory) of the storage device. There may be various ways to store the data in the storage device. For example, the data may be stored according to a row-based storage technique, where column values of a single row are stored contiguously in an address space. The row-based storage technique may be beneficial for online transactional processing (OLTP) applications that may target write heavy transactions that support inserts, updates, deletes, and the like.

The data may also be stored according to a column-based (columnar) storage technique. In the columnar technique, values of a single column for multiple rows are stored contiguously in an address space. The columnar technique may be beneficial for online analytical (OLAP) applications that target data analytics where a dominant operation may be a read operation. With the columnar technique, one or more relevant columns may be read for the data analytics without reading other columns that may not be relevant for a current analysis. The column-based storage format may also be more effective for compression than the row-based format.

In general terms, embodiments of the present disclosure are directed to a scalable data storage system for data analytics acceleration for a storage device. The system may take a row-based database from the host, and group and/or partition the rows into one or more chunks and/or partitions. The size of the partitions may be configurable (e.g., by a user). In various embodiments of the disclosure, the size of the partition may be a multiple of a size of a database (DB) page (e.g., 8 KB). In various embodiments of the disclosure, the chunk size is aligned with a redundant array of independent disks (RAID) chunk/stripe size. For example, the chunk size may be equal to the RAID stripe size. In another example, the chunk size may be such that the RAID stripe size is a multiple of the chunk size.

In various embodiments of the disclosure, one or more DB pages of the row-based database making up a chunk is converted into a columnar storage format and stored to one or more storage devices. The storing of the row-based data in the columnar storage format may allow savings in storage space as columnar data may be more effective for compression.

In various embodiments of the disclosure, the partitioning of the rows into chunks, and converting of the data into the columnar format (together referred to as a hybrid storage technique), is performed by the host computing device offline during a pre-processing stage (e.g., prior to an execution phase when the storage device receives a query from an application in the host to perform a computation based on the data). The offline processing may result in lower latency, higher throughput, and lower power consumption compared to a row-based storage system that performs inline row-to-column conversions during the execution phase. In addition, the hybrid storage technique may work without requiring change of data infrastructure such as a file system, partitioning method, or database application.

FIG. 1 is a block diagram of a computer system for implementing a hybrid storage technique according to various embodiments of the disclosure. The system may include a host computing device ("host") 100 coupled to one or more computational storage devices ("storage devices") 102a-102c (collectively referenced as 102) over a wired or wireless storage interface 104a-104c (collectively referred to as 104) including Ethernet, fiber channel, and/or other storage interface. In various embodiments of the disclosure, the storage devices 102 are in a RAID system configuration.

In various embodiments of the disclosure, the host transfers and receives data to and from the storage devices 102 over the storage interface 104, using a storage interface connector and associated protocol. The storage interface protocol may be, for example, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like.

The storage device 102 may be a solid state drive (SSDs) with an embedded processor 105, such as a field programmable gate array (FPGA), an SSD controller, and/or a discrete co-processor. In some embodiments, the embedded processor may be a graphics processing unit (GPU), tensor processing unit (TPU), and/or another application-specific integrated circuit (ASIC).

The embedded processor 105 may be configured to perform various types of computations including data analytics computations offloaded to the storage device 102 by an OLAP application running in the host device 100. One exemplary data analytics computation may be to read data associated with one or more columns from a non-volatile memory (NVM) media 107 of the storage device 102, perform aggregation (or other analytics) operations based on the data, and transmit results of the aggregation/analytics operations to the host 100, via the storage interface 104.

The NVM media 107 may include one or more types of non-volatile memory such as, for example, flash memory. The NVM media 107 may be configured to store data according to a RAID stripe size.

In various embodiments of the disclosure, the host 100 includes one or more processors 106 configured to execute computer program instructions stored in memory 108. The computer program instructions may include instructions of an OLAP application. In various embodiments of the disclosure, the OLAP application may generate data and store the data in one or more database (DB) pages stored in a DB 110 in the memory 108. The DB 110 may have one or more rows and columns. In various embodiments of the disclosure, a DB page in the database 110 stores data in a row-based format (e.g., a heap, JavaScript Object Notation (JSON), comma separated values (CSV), or the like). The row-based storage format may store column values of a row contiguously within the row-based DB page.

In various embodiments of the disclosure, the processor 106 includes a preprocessor 112 that is configured to execute the hybrid storage technique during a pre-processing phase, prior to an execution phase when a query from an application in the host 100 is executed to perform a computation based on stored data. In this regard, the preprocessor 112 may execute instructions in the memory 108 to partition one or more rows of the database 110 into chunks/partitions. The size of the partitions may depend on the size of a DB page, and/or a RAID chunk/stripe size.

In various embodiments of the disclosure, the preprocessor 112 identifies rows of the DB 110 based on the partition size. The identified rows in the row-based DB page may be converted into a columnar format where values of a column for multiple rows in the row-based DB page, are stored contiguously in a column-based DB page. The translation of the row-based DB page into a column-based DB page may entail parsing the rows of the row-based DB page to identify one or more columns, and storing the values of a column, for multiple rows, contiguously in the column-based DB page. The column-based DB page may thus contain row-aligned columns.

In various embodiments of the disclosure the preprocessor 112 generates an appropriate page header for the columns, and stores the page header in the column-based DB page along with the DB data stored in the column-based format. The page header may include a column pointer that points to a start (or end) of a column, and metadata for the column. The metadata may include attributes about the column such as, for example, column type, number of values of the column, and/or the like In various embodiments of the disclosure, the preprocessor 112 is configured to encode and/or compress the column-based DB page prior to writing into the storage device 102. For example, the preprocessor 112 may use an encoding and/or compression strategy such as, for example, run length encoding (RLE), delta encoding, bit packing, and/or the like, to encode/compress (e.g., column by column) based on the data type of the column. Because the data type of data stored in a column may be similar, the compression may be more effective than compressing data stored in a row-based format where the data types may be different. Effective encoding/compression may be useful for optimizing storage space of a storage device.

In various embodiments of the disclosure, if there is extra space in the column-based DB page after the encoding/compression, extra data may be added to the page, or extra DB pages may be generated, until a chunk of the desired chunk size is achieved. In various embodiments of the disclosure, once a chunk of the desired chunk size is generated, the preprocessor 112 transmits a command to write the chunk containing the column-based DB page(s) into the storage device 102.

In various embodiments of the disclosure, the processor 105 of the storage device 102 receives and processes the write command from the host 100 during an execution phase. For example, the processor 105 may access a chunk made up of one or more column-based DB pages from the host memory 108, and write the chunk into the NVM media 107. In various embodiments of the disclosure, data is written into the storage device 102 one chunk at a time until the stripe size of the storage device is filled.

Figure 2:
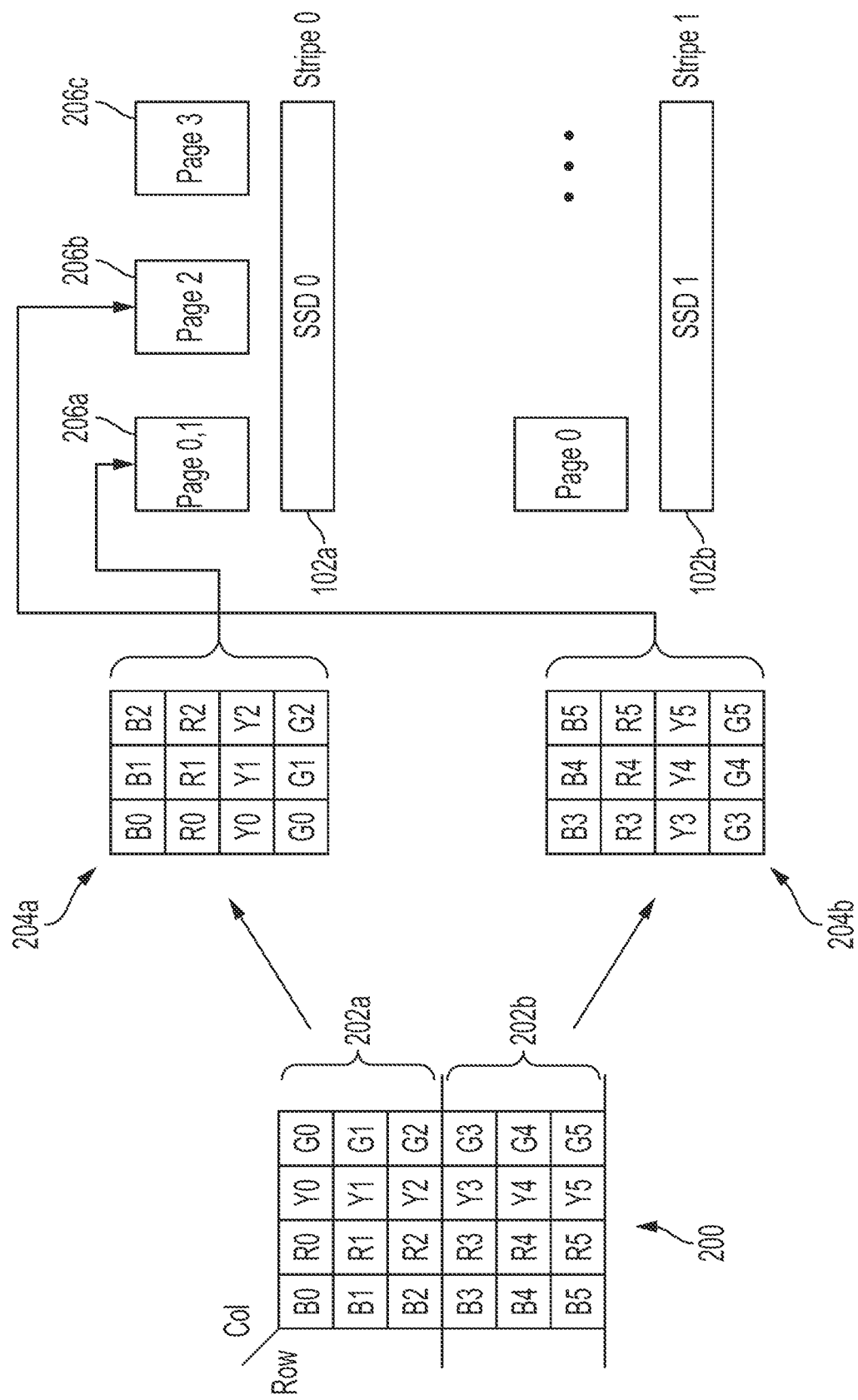
FIG. 2 is a conceptual layout diagram of the hybrid storage technique according to various embodiments of the disclosure.

FIG. 2 is a conceptual layout diagram of the hybrid storage technique according to various embodiments of the disclosure. An OLAP application running in the host 100 may generate a DB 200 (similar to DB 110). The DB 200 may include one or more row-based DB pages storing data using the row-based storage format.

The preprocessor 112 may partition one or more rows of the DB 200 into a partition 202a, 202b (collectively referenced as 202). The partition 202 may have a user-configurable partition size. In generating the partition 202, the preprocessor 112 may identify the rows of the DB 200 that will fill the partition 202, and convert the data in the rows into a column-based format 204a, 204b (collectively referenced as 204). The converted data may be stored in one or more column-based DB pages 206a-206c (collectively referenced as 206). In this regard, the preprocessor 112 may parse one or more row-based DB pages of the DB 200, and reorganize the data into the one or more column-based DB pages. The parsed row-based DB pages may be flushed from the host memory 108 when the conversion is complete.

In various embodiments of the disclosure, a partition including the one or more column-based DB pages 206 are written to the storage device 102, and partitioned as RAID pages. In various embodiments of the disclosure, column-based DB pages are written into a first storage device (e.g., storage device 102a) until the stripe size of the first storage device has been filled. In response to the stripe size of the first storage being filled, a second storage device (e.g., storage device 102b) may be selected for storing additional column-based DB pages.

Figure 3A:
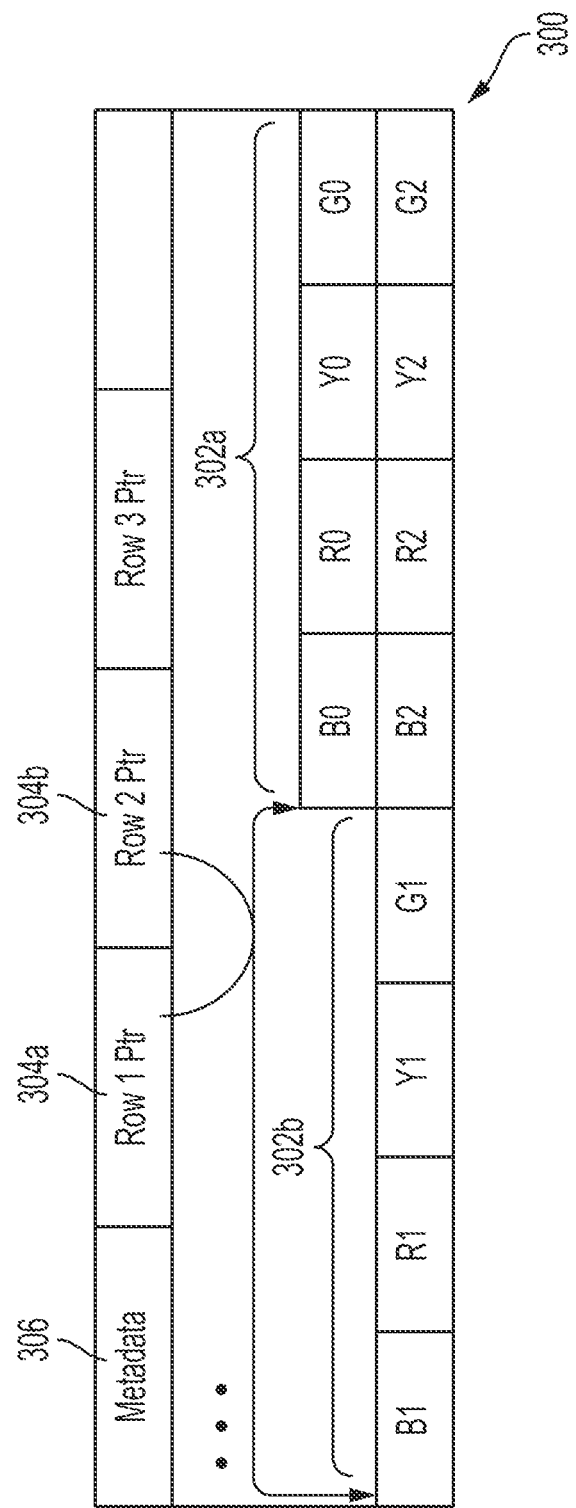
FIG. 3A is a layout diagram of an exemplary row-based database page according to various embodiments of the disclosure.

FIG. 3A is a conceptual layout diagram of an exemplary row-based DB page 300 stored in the DB 110 according to various embodiments of the disclosure. In various embodiments of the disclosure, the DB page 300 is generated by an OLAP application running on the host device 100. The DB page 300 may store data in a row-based format, where values of a column in a row 302a, 302b are stored consecutively within the DB page 300. The DB page 300 may further store header data, such as pointers to the rows (e.g., pointers 304a, 304b to respectively rows 302a, 302b), and other metadata 306 about the row-based DB page 300.

Figure 3B:
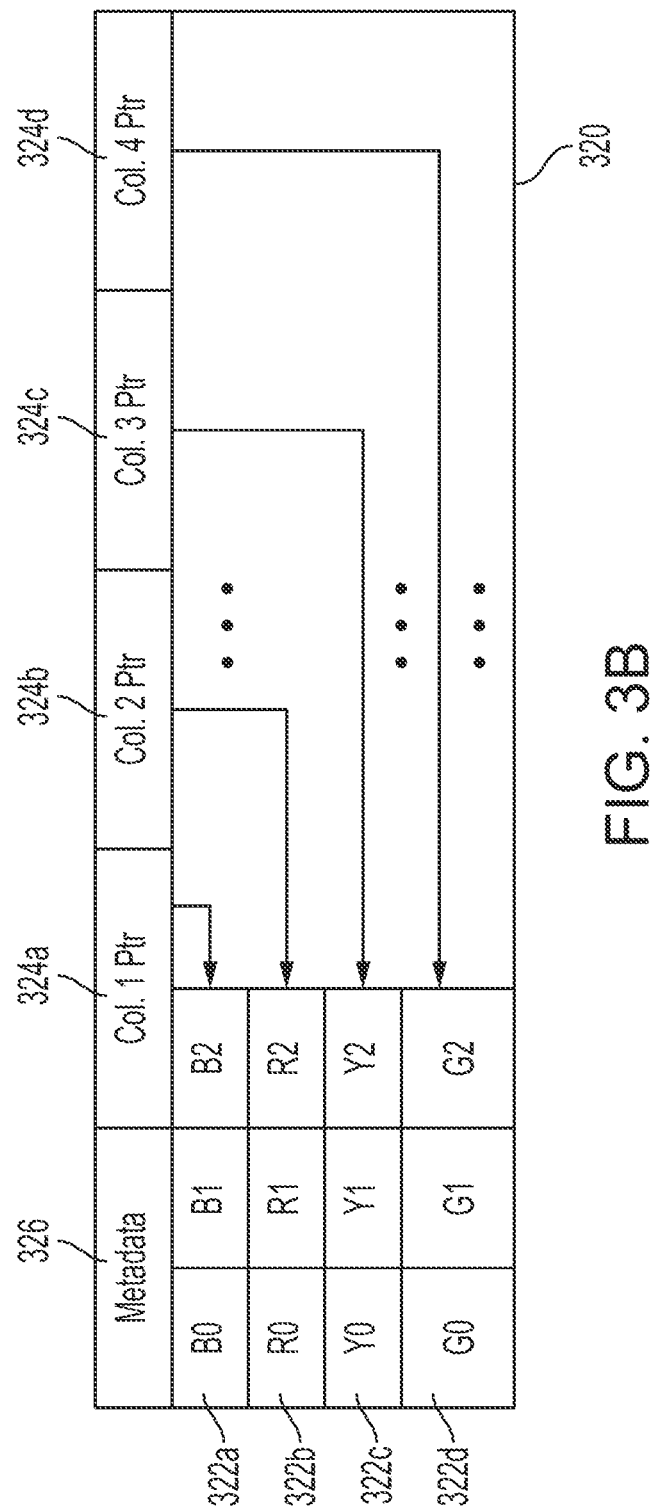
FIG. 3B is a conceptual layout diagram of a column-based database page according to various embodiments of the disclosure.

FIG. 3B is a conceptual layout diagram of a column-based DB page 320 according to various embodiments of the disclosure. In the example of FIG. 3, the column-based DB page 320 is generated based on the row-based DB page 300 of FIG. 3A. In various embodiments of the disclosure, the values in the rows (e.g., rows 302, 302b) are parsed by the preprocessor 112, and stored in the page 320 in the column-based storage format where the values of columns 322*a*-322*d* (collectively referenced as 322) are stored consecutively within the page 320.

The preprocessor 112 may also generate and store into the column-based DB page 320, a page header including pointers 324*a*-324*d* (collectively referenced as 324). The pointers may identify starting (or ending) locations of the columns 322.

The page header may also include metadata 326 for the columns 322. The metadata 326 for the columns 322 may include, for example, a type of data stored in the column, type of encoding used for the column, compression codec, number of values in the column, minimum and maximum values for the column, and/or the like. In regards to the minimum and maximum values, such information may ensure that some of the pages whose columns do not lie in a range of a query by the OLAP application, are not read by the storage device.

In some embodiments, one or more of the metadata 306 in the original row-based DB page 300 may be carried over to the column-based DB page 320. In various embodiments of the disclosure, in response to the row-to-column translation, the row-based DB page is flushed from the host memory 108.

Figure 4:
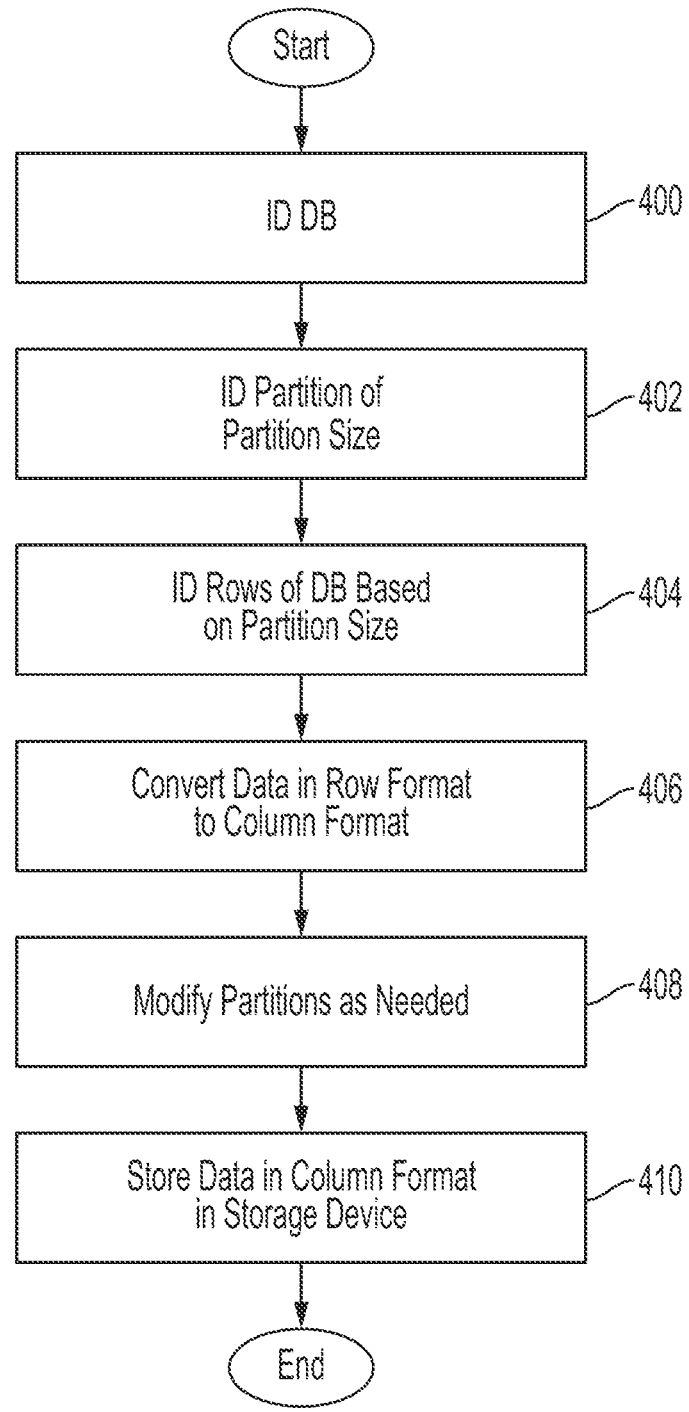
FIG. 4 is a flow diagram of a process for hybrid storage technique according to various embodiments of the disclosure.

FIG. 4 is a flow diagram of a process for hybrid storage technique according to various embodiments of the disclosure. The process starts, and in act 400, the preprocessor 112 identifies the DB 110 stored in the host memory 108. The DB 110 may include data in one or more rows and columns. The DB 100 may be generated by an OLAP application running in the host 100. The data in the DB 100 may be organized in a row-based format where column values of a first row are stored contiguously in a DB page, followed by column values of a second row of the DB page.

In act 402, the preprocessor 112 identifies a partition having a partition size for grouping one or more of the rows into the partitions. The partition size may be based, for example, on a size of a DB page, a RAID stripe size, and/or the like.

In act 404, the preprocessor 112 identifies one or more rows of the DB 100 based on the partition size. In this regard, the preprocessor 112 may partition the rows of the DB 110 to fill the partition size. In the event that the DB 110 does not yet contain sufficient data to fill the partition, the preprocessor 112 may wait until the OLAP application generates sufficient data to fill the partition, or until expiration of a set time. If the partition cannot be filled at the expiration of the set time, the preprocessor 112 may proceed with the hybrid storage technique based on the lesser amount of data.

In act 406, the preprocessor 112 converts the data stored in the identified rows, into a column-based format. In this regard, the preprocessor may parse a first DB page containing the data stored in the row-based format, and store the parsed data into a second DB page in the column-based format. In the column-based format, the data values of a first column for a plurality of rows may be stored consecutively in the second DB page, followed by data values of a second column for the plurality of rows. The preprocessor 112 may further generate and store into the second, column-based DB page, header data including pointers to the columns in the second DB page, and metadata about the columns.

Figure 5A:
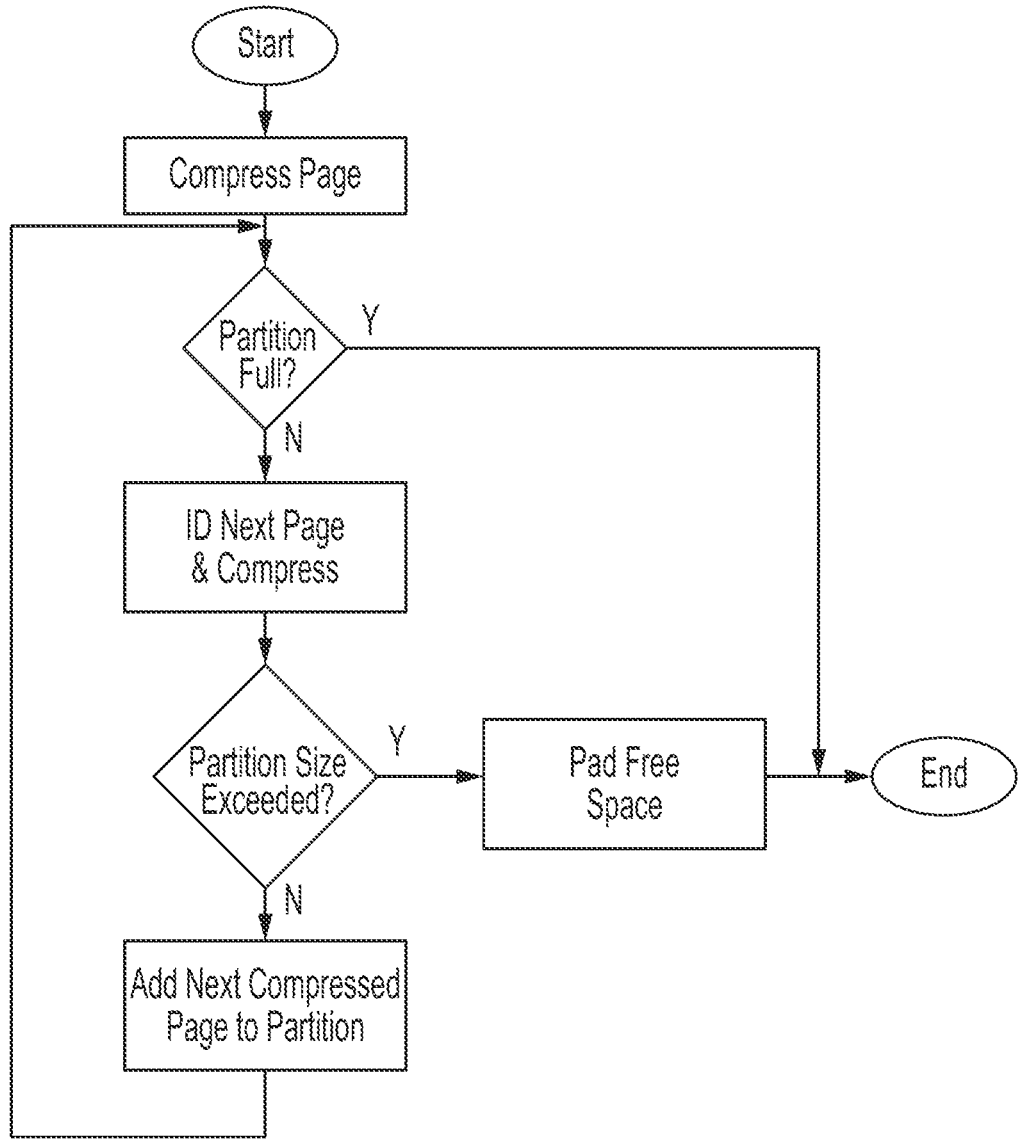
FIG. 5A is a flow diagram of a process for adding database data to a database partition as needed, according to various embodiments of the disclosure.
Figure 5B:
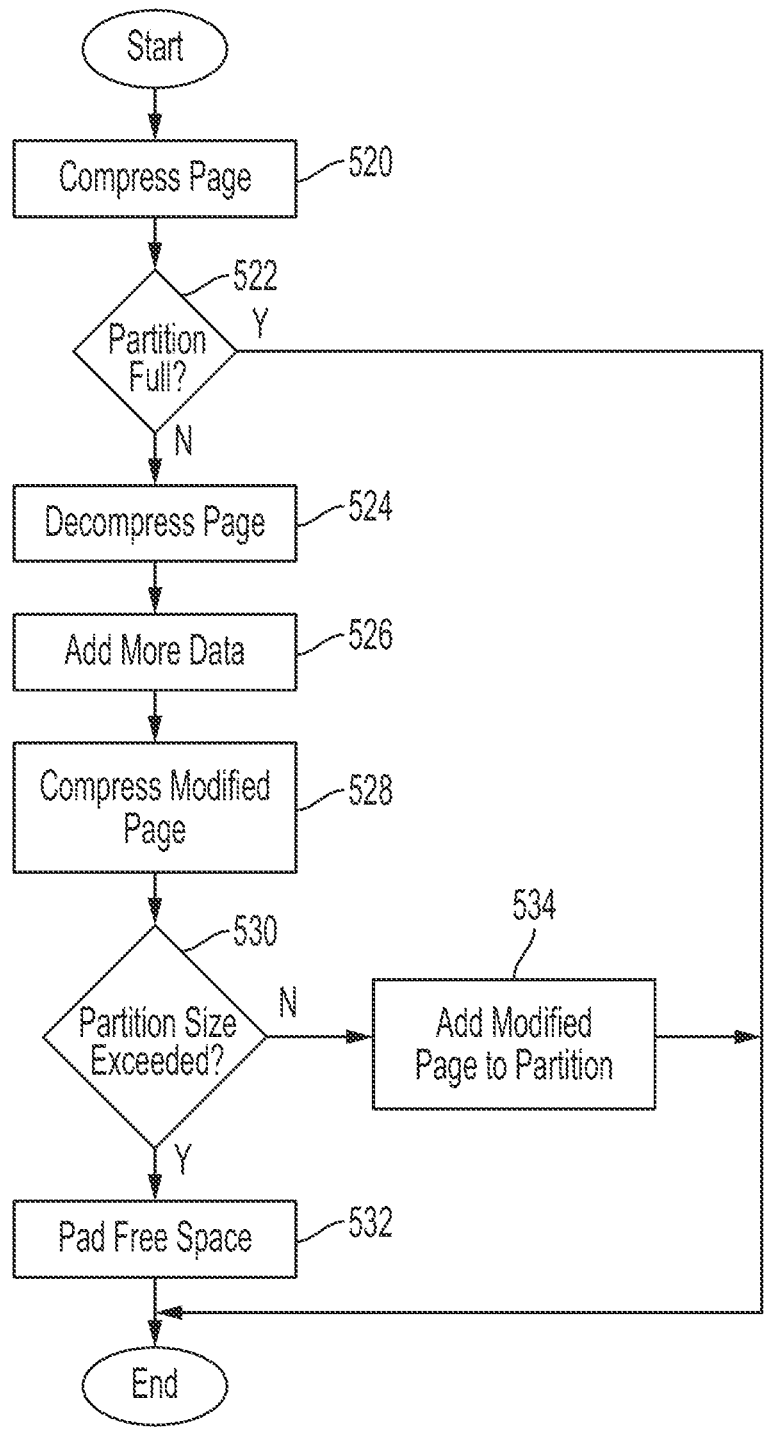
FIG. 5B is another flow diagram of a process for adding DB data to a partition as needed, according to various embodiments of the disclosure.

In act 408, the preprocessor 112 adds more data to the partition, as necessary, as described in further detail in FIGS. 5A and 5B.

In act 410, the data in the partition is stored to the storage device 102 in the column-based format. The storing may be in response to the preprocessor 112 submitting a command to write data into the storage device 102. In response to receiving the write command, the storage device 102 may retrieve the data contained in the partition from the memory 108, and write the data into the NVM 107, partitioned as RAID pages.

FIG. 5A is a flow diagram of a process for adding DB data to a partition (e,g, partition 202) as needed, according to various embodiments of the disclosure. The process starts, and in act 500, the preprocessor 112 encodes/compresses a first column-based DB page generated in act 406 (FIG. 4). For example, the preprocessor 112 may use an encoding and/or compression strategy such as, for example, run length encoding (RLE), delta encoding, bit packing, and/or the like, to encode/compress (e.g., column by column) based on the data type of the column.

In act 502, a determination is made as to a characteristic of the partition in response to the encoding/compressing of the data. The characteristic may be, for example, fullness of the partition. If the partition is not full (e.g., the size of the encoded first column-based DB page is less the size of the partition), the preprocessor 112 identifies a next compressed page in act 504. For example, the preprocessor 112 may identify a row of the DB 110 not already included in the partition, and convert the data in the row into a column-based format. The converted data may be stored into a second column-based DB page. The second column-based DB page may also be compressed.

In act 506 a determination is made as to whether adding the second column-based DB page will cause the partition size to be exceeded. If the answer is YES, the available space in the first column-based DB page is padded with filler data (e.g., 0's), in act 508. The partition may thus consist of the first column-based DB page padded with filler data.

If, however, the adding of the second column-based DB page does not cause the partition size to be exceeded, the second page is added to the partition, in act 510, and the process repeats until no more pages can be added to the partition. In various embodiments of the disclosure, the preprocessor 112 maintains a linked list of the DB pages in the partition. In this manner, the linked list may be followed from start to end when it is time to write the partitioned data into the storage device 102.

FIG. 5B is another flow diagram of a process for adding DB data to a partition (e,g, partition 202) as needed, according to various embodiments of the disclosure. The process starts, and in act 520, the preprocessor 112 encodes/compresses a column-based DB page generated in act 406 (FIG. 4). For example, the preprocessor 112 may use an encoding and/or compression strategy such as, for example, run length encoding (RLE), delta encoding, bit packing, and/or the like, to encode/compress (e.g., column by column) based on the data type of the column.

In act 522, a determination is made as to the fullness of the partition in response to the encoding/compressing of the data. If the partition is not full, the preprocessor 112, decodes/decompresses the column-based DB page in act 524.

In act 526, the preprocessor 112 adds additional data to the column-based DB page. For example, the preprocessor 112 may identify a row of the DB 110 not already included in the partition, and convert the data in the row into a column-based format. The converted data may be stored into the column-based DB page, and compressed again in act 528.

In act 530 a determination is made as to whether the modified, column-based DB page will cause the partition size to be exceeded. If the answer is YES, the additional data is not added to the page, and the available space in the page is padded with filler data, such as, for example, 0's, in act 532. The partition may thus consist of the initial column-based DB page, padded with the filler data.

If, however, the adding of the additional data does not cause the partition size to be exceeded, the modified column-based DB page is added to the partition, in act 534.

Figure 6:
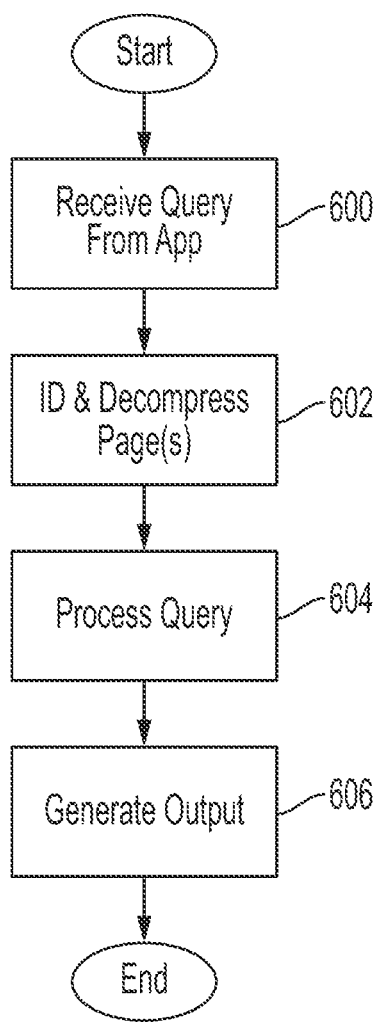
FIG. 6 is flow diagram of a process for executing a query from an online analytical processing application running on a host device, during an execution phase, according to various embodiments of the disclosure.

FIG. 6 is flow diagram of a process for executing a query from an OLAP application running on the host device 100, during an execution phase, according to various embodiments of the disclosure. The process starts, and in act 600 the processor 105 of the storage device 102 receives a query from the OLAP application. The query may relate to data stored in one or more columns of one or more pages stored in the NVM media 107.

In act 602, the processor 105 identifies and decompresses one or more compressed pages stored in the NVM media 107 based on the query. For example, the processor 105 may select and decompress one or more pages whose columns lie in a query range. The determination as to whether the columns lie in the query range may be, for example, based on the metadata 326 (FIG. 3B) stored as page header data in each page. The type of decompression to perform may also be based on the metadata 326 stored as the page header data.

In act 604, the processor 105 processes the query based on the decompressed column data. In this regard, data in the appropriate columns may be retrieved based on the column pointers 324 stored as the page header data. The processing of the query may include, for example, performing a computation using the retrieved data, such as, for example, a data analytics computation.

In act 606, the processor 104 returns an output in response to the processing. The output may be, for example, results of data analytics using the retrieved data. The output may be delivered to the querying OLAP application.

In some embodiments, the systems and methods discussed above for implementing a hybrid storage technique, are implemented in one or more processors. The term processor may refer to one or more processors and/or one or more processing cores. The one or more processors may be hosted in a single device or distributed over multiple devices (e.g., over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g., memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

With respect to the flow diagrams of FIGS. 4-6, it should be understood that the sequence of steps of the processes in these diagrams are not fixed, but can be modified, changed in order, performed differently, performed sequentially, concurrently, or simultaneously, or altered into any desired sequence, as recognized by a person of skill in the art.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of systems and methods discussed above for implementing a hybrid storage technique have been specifically described and illustrated herein, many modifications and variations will be apparent to those skilled in the art. Accordingly, it is to be understood that systems and methods discussed above for implementing a hybrid storage technique constructed according to principles of this disclosure may be embodied other than as specifically described herein. The disclosure is also defined in the following claims, and equivalents thereof.

What is claimed is:

1. A method for storing and processing data, the method comprising:
 identifying a database stored in a first memory of a host device, the database having one or more rows and one or more columns, the host device including a first processor coupled to the first memory;
 identifying, by the first processor, a partition size;

based on identifying the partition size, identifying, by the first processor, the one or more rows of the database based on the partition size;

converting, by the first processor, data stored in the one or more rows, into a column-based format;

storing the data in a data structure having the partition size, wherein the data is stored in the data structure in the column-based format;

determining, by the first processor, a condition related to the partition size;

storing, by the first processor, second data in the data structure based on determining the condition related to the partition size; and transmitting, by the first processor, a command to store the data structure in a storage device having a second processor and a second memory, wherein the data in the data structure is stored in the second memory in the column-based format, wherein in response to a query, the second processor of the storage device is configured to retrieve the data stored in the column-based format from the second memory, and process the query based on the data.

2. The method of claim 1, wherein the partition size is a multiple of a size of a database page.

3. The method of claim 1, wherein the partition size is based on a redundant array of Independent (RAID) stripe size.

4. The method of claim 1, wherein in the column-based format, values of one of the one or more columns for the one or more rows are stored contiguously in an address space.

5. The method of claim 1, wherein the converting of the data includes generating a database page storing the data in the column-based format.

6. The method of claim 5, wherein the database page includes one or more pointers to the one or more columns stored in the database page.

7. The method of claim 5 further comprising:
encoding the database page, wherein the database page is included in the partition;
determining a second characteristic of the partition; and
generating a second database page based on determining the second characteristic, wherein the second database page stores data in a second row of the database, in the column-based format; and
including the second database page into the partition.

8. The method of claim 5 further comprising:
encoding the database page, wherein the database page is included in the partition;
determining a second characteristic of the partition; and
based on determining the second characteristic, adding second data stored in a second row of the database, to the database page, in the column-based format.

9. The method of claim 1, wherein the database is generated by an application running in the host device, wherein the query is generated by the application.

10. The method of claim 1, wherein the second memory of the storage device includes a non-volatile memory.

11. A system for storing and processing data, the system comprising:
a first processor; and
a first memory, wherein the first memory stores instructions that, when executed by the first processor, cause the first processor to:
identify a database stored in the first memory, the database having one or more rows and one or more columns;
identify a partition size;
based on identifying the partition size, identify the one or more rows of the database based on the partition size;
convert data stored in one or more columns of the one or more rows, into a column-based format, wherein the data stored in the column-based format is associated with the partition;
store the data in a data structure having the partition size, wherein the data is stored in the data structure in the column-based format;
determine a condition related to the partition size:
store second data in the data structure based on determining the condition related to the partition size; and
transmit a command to store the data structure in a storage device having a second processor and a second memory, wherein the data in the data structure is stored in the second memory in the column format, wherein in response to a query, the second processor of the storage device is configured to retrieve the data stored in the column format from the second memory, and process the query based on the data.

12. The system of claim 11, wherein the partition size is a multiple of a size of a database page.

13. The system of claim 11, wherein the partition size is based on a redundant array of Independent (RAID) stripe size.

14. The system of claim 11, wherein in the column-based format, values of one of the one or more columns for the one or more rows are stored contiguously in an address space.

15. The system of claim 11, wherein the instructions that cause the first processor to convert the data include instructions that cause the first processor to generate a database page storing the data in the column-based format.

16. The system of claim 15, wherein the database page includes one or more pointers to the one or more columns stored in the database page.

17. The system of claim 15, wherein the instructions further cause the first processor to:
encode the database page, wherein the database page is included in the partition;
determine a characteristic of the partition; and
generate a second database page based on the determining, wherein the second database page stores data in a second row of the database, in the column-based format; and
include the second database page into the partition.

18. The system of claim 15, wherein the instructions further cause the first processor to:
encode the database page, wherein the database page is included in the partition;
determine a characteristic of the partition; and
based on the determining, add second data stored in a second row of the database, to the database page, in the column-based format.

19. The system of claim 11, wherein the database is generated by an application executed by the first processor, wherein the query is generated by the application.

20. The system of claim 11, wherein the second memory of the storage device includes a non-volatile memory.

* * * * *